United States Patent
Lin et al.

(10) Patent No.: US 7,100,580 B2
(45) Date of Patent: Sep. 5, 2006

(54) GAS FILTERING AND RECIRCULATING DEVICE FOR GENERAL MACHINE

(75) Inventors: Tsang-Mao Lin, Kaohsiung (TW); Chun-Hung Hsieh, Kaohsiung County (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 116 days.

(21) Appl. No.: 11/025,958

(22) Filed: Jan. 3, 2005

(65) Prior Publication Data

US 2006/0144371 A1   Jul. 6, 2006

(51) Int. Cl.
*F02M 33/02*   (2006.01)

(52) U.S. Cl. .................. 123/516; 123/518; 123/519

(58) Field of Classification Search ................ 123/516, 123/518, 519, 520
See application file for complete search history.

(56) References Cited

U.S. PATENT DOCUMENTS

| | | | | |
|---|---|---|---|---|
| 3,884,204 A | * | 5/1975 | Krautwurst et al. ........ | 123/519 |
| 4,852,761 A | * | 8/1989 | Turner et al. ............... | 220/746 |
| 4,919,103 A | * | 4/1990 | Ishiguro et al. ............. | 123/514 |
| 5,408,977 A | * | 4/1995 | Cotton ....................... | 123/520 |
| 5,427,076 A | * | 6/1995 | Kobayashi et al. ......... | 123/520 |
| 5,647,331 A | * | 7/1997 | Swanson .................... | 123/516 |
| 5,855,198 A | * | 1/1999 | Nakajima et al. ........... | 123/520 |
| 5,901,689 A | * | 5/1999 | Kimura et al. .............. | 123/518 |
| 5,988,145 A | * | 11/1999 | Horiuchi et al. ............ | 123/519 |
| 6,182,693 B1 | * | 2/2001 | Stack et al. ............ | 137/565.17 |
| 6,237,574 B1 | * | 5/2001 | Jamrog et al. .............. | 123/519 |
| 6,269,802 B1 | * | 8/2001 | Denis et al. ................ | 123/519 |
| 6,273,070 B1 | * | 8/2001 | Arnal et al. ................ | 123/519 |
| 6,276,387 B1 | * | 8/2001 | Pachciarz et al. ............. | 137/43 |
| 6,367,458 B1 | * | 4/2002 | Furusho et al. ............. | 123/519 |
| 6,463,915 B1 | * | 10/2002 | Ozaki et al. ................ | 123/519 |
| 6,523,527 B1 | * | 2/2003 | Ozaki et al. ................ | 123/519 |
| 7,047,948 B1 | * | 5/2006 | Gerhardt et al. ............ | 123/516 |
| 2005/0284450 A1 | * | 12/2005 | Mills ........................ | 123/519 |

* cited by examiner

*Primary Examiner*—Thomas Moulis
(74) *Attorney, Agent, or Firm*—Bacon & Thomas

(57) ABSTRACT

The present invention relates to a gas filtering and recirculating device for a general machine having an engine and a fuel tank provided above the engine, which is mountable above the fuel tank and comprises at its one end an air outlet in fluid communication with atmosphere and an oil drain below the air outlet and above the fuel tank such that the oil drain is proximate the fuel tank, enabling the gas filtering and recirculating device to completely filter and absorb gas generated by fuel in the fuel tank and prevent the gas from discharging into the atmosphere via an air outlet in the fuel tank and causing air pollution.

4 Claims, 5 Drawing Sheets

GAS FILTERING AND RECIRCULATING DEVICE FOR GENERAL MACHINE

FIELD OF THE INVENTION

The present invention relates to a pollution control devices' more particularly to a gas filtering and recirculating device capable of completely filtering and absorbing gas generated by fuel in a fuel tank of a general machine and preventing the gas generated by the fuel from discharging into the atmosphere via an air outlet in the fuel tank and causing air pollution.

BACKGROUND OF THE INVENTION

Pollution (e.g., water pollution, noise, air pollution, etc.) has become a global issue as technology makes progress rapidly. Also, more people pay attention to pollution because people are aware of the importance of environmental protection. Further, many governments have given strict laws and enforced the same so as to effectively control pollution. For example, for decreasing air pollution toxic gas generated by fuel in a fuel tank is not allowed to discharge into the atmosphere as enacted by the governments.

However, air pollution caused by machines such as mowers, generators, pump motors, etc. is inevitable as known in the art. Note that the term "general machine" used in the present specification is referred to any of the above mowers, generators, pumps, etc.

Referring to FIG. 1, a typical general machine 10 comprises an engine 11, a fuel tank 12 provided above the engine 11, a fuel inlet 13 on a top of the fuel tank 12 in which fuel is flowed into the fuel tank 12 via the fuel inlet 13, and a cover 14 enclosed the fuel inlet 13 for preventing fuel from spilling out of the fuel inlet 13.

Moreover, the general machine 10 further comprises an air filter 15 provided besides the engine 11, a carburetor 16 for mixing fuel supplied from the fuel tank 12 with pure air supplied from the air filter 15 to make an explosive mixture which is then supplied to the engine 11 for combustion, and a crank case 17 having a crank shaft 18 adapted to rotate in response to the combustion. As an end, the purpose of developing mechanical power for starting motion in another machine is achieved by the general machine 10.

However, the prior general machine 10 suffered from a disadvantage. For example, as shown in FIG. 1 for facilitating fuel in the fuel tank 12 flowing into the carburetor 16 an air outlet 19 is provided on the top of the fuel tank 12. The provision of the air outlet 19 aims at utilizing atmospheric pressure to quickly direct fuel in the fuel tank 12 to the carburetor 16 so as to mix with pure air supplied from the air filter 15 for making an explosive mixture. Unfortunately, toxic gas may be generated by fuel in the fuel tank 12 to discharge into the atmosphere via the air outlet 19, resulting in air pollution. Thus, the need for improvement still exists.

SUMMARY OF THE INVENTION

After considerable research and experimentation, a novel gas filtering and recirculating device for a general machine according to the present invention has been devised so as to overcome the above drawback of the prior art. The drawback is that for facilitating fuel in the fuel tank flowing into the carburetor an air outlet is provided on the top of the fuel tank, the air outlet undesirably directly discharging toxic gas generated by fuel in the fuel tank into the atmosphere via the air outlet.

It is an object of the present invention to, in a general machine including an engine, a fuel tank provided above the engine, a fuel inlet provided on a top of the fuel tank, a gas outlet provided on the top of the fuel tank, an air filter provided besides the engine, and a carburetor provided besides the air filter, provide a gas filtering and recirculating device mountable above the fuel tank comprising at its one end an air outlet in fluid communication with atmosphere, and an oil drain below the air outlet and above the fuel tank such that the oil drain is proximate the fuel tank. Thus, the advantages of the present invention comprise:

i) Gas generated by fuel in the fuel tank can be completely filtered and absorbed by the gas filtering and recirculating device since the gas filtering and recirculating device is provided above the fuel tank. Also, oil spilled out of the full fuel tank may not fall on the gas filtering and recirculating device because the gas filtering and recirculating device is disposed above the fuel tank. Otherwise, the function of the gas filtering and recirculating device is compromised. Moreover, oil drops formed by accumulating gas in the gas filtering and recirculating device may smoothly exit the oil drain since the oil drain is disposed below the air outlet. This can avoid the blocking of the gas filtering and recirculating device. Otherwise, the engine may not start or the operating engine may stop operating suddenly.

ii) The purpose of ease of maintenance of the gas filtering and recirculating device can be obtained by disposing the gas filtering and recirculating device above the fuel tank.

iii) Oil drops formed by accumulating gas in the gas filtering and recirculating device may smoothly exit the oil drain to fall on an oil pan (i.e., cold area) on the-top of the fuel tank only without flowing to other areas. As such, danger caused by a separate hot area (e.g., the exhaust manifold and the heat resisting cover member) can be prevented.

iv) The gas filtering and recirculating device is inclined at an angle of $\alpha$ with respect to a horizontal plane passing a top of the fuel tank. As such, oil drops may smoothly exit the oil drain to fall on the oil pan.

The above and other objects, features and advantages of the present invention will become apparent from the following detailed description taken with the accompanying drawings.

DETAILED DESCRIPTION OF THE PREFERRED EMBODIMENTS

Figure 1:
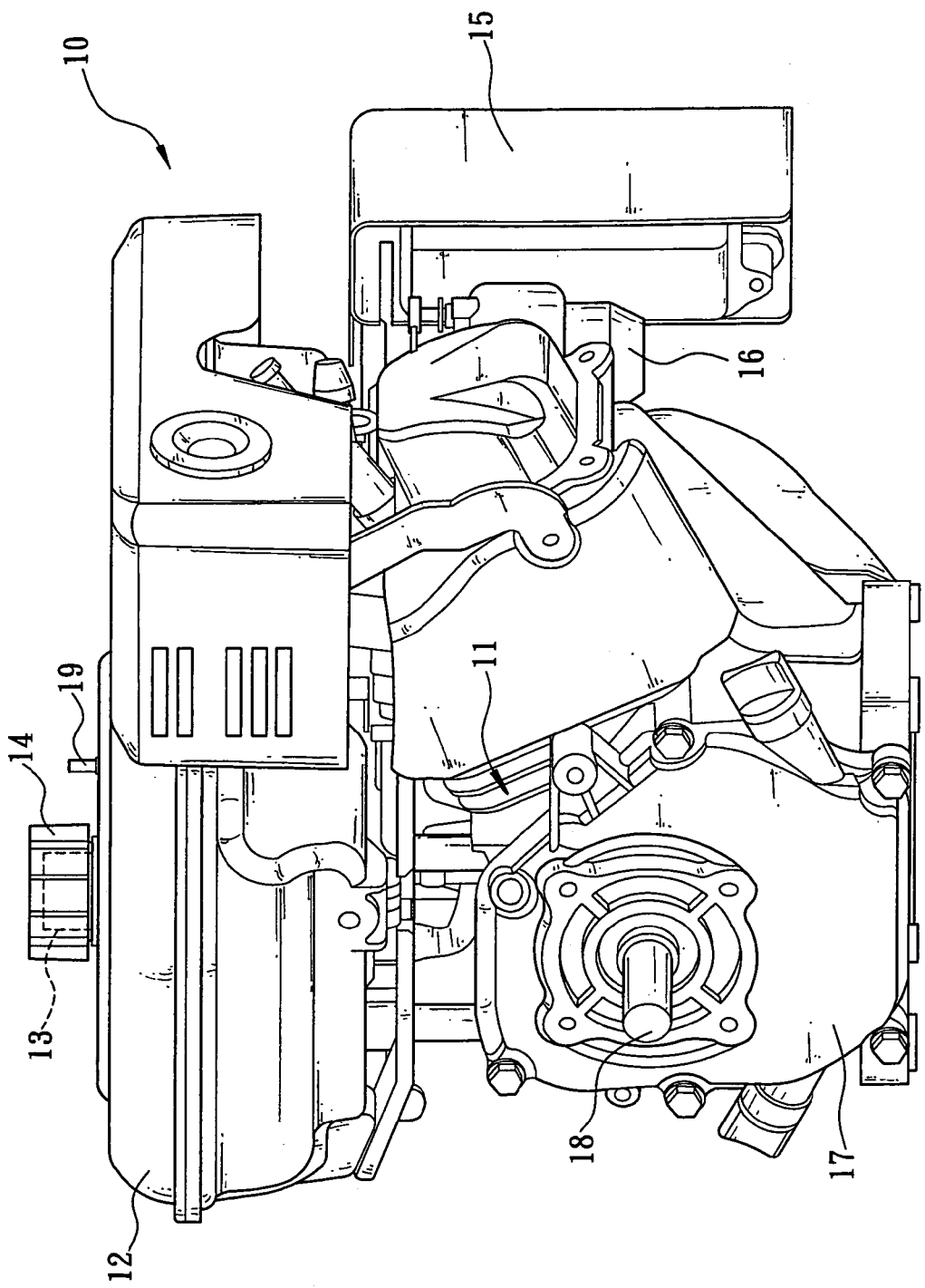
FIG. 1 is a perspective view of a prior general machine.
Figure 2:
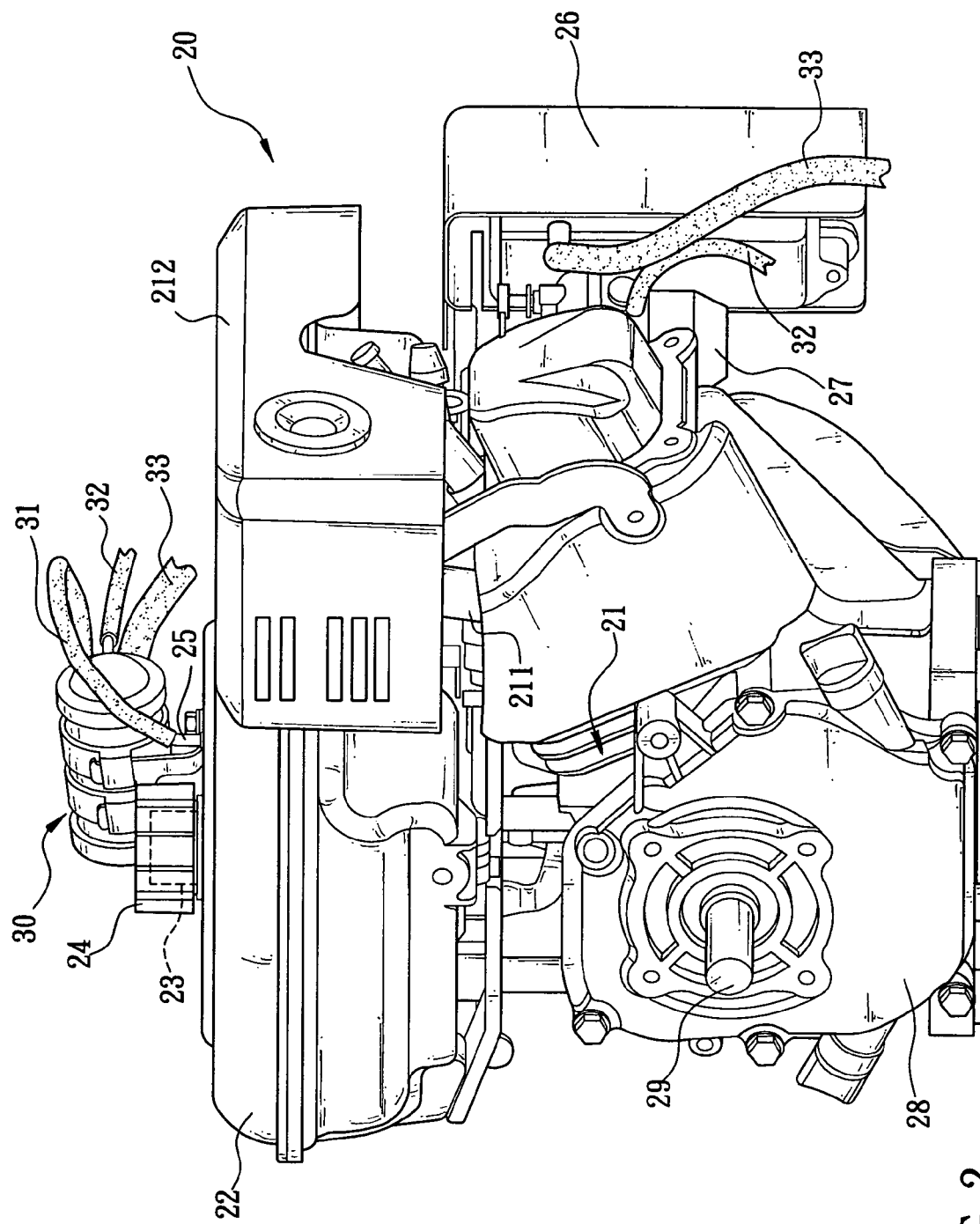
FIG. 2 is a perspective view of a general machine according to a preferred embodiment of the invention.

Referring to FIG. 2, there is shown a general machine 20 according to a preferred embodiment of the invention. The general machine 20 comprises an engine 21, a fuel tank 22 provided above the engine 21, a fuel inlet 23 provided on a top of the fuel tank 22 in which fuel is flowed into the fuel tank 22 via the fuel inlet 23, a cover 24 enclosed the fuel inlet 23 for preventing fuel from spilling out of the fuel inlet 23, and a gas outlet 25 provided on the top of the fuel tank 22 proximate the fuel inlet 23.

Moreover, the general machine 20 further comprises an air filter 26 provided besides the engine 21, a carburetor 27 for mixing fuel supplied from the fuel tank 22 with pure air supplied from the air filter 26 to make an explosive mixture which is then supplied to the engine 21 for combustion, and a crank case 28 having a crank shaft 29 adapted to rotate in response to the combustion. As an end, the purpose of developing mechanical power for starting motion in another machine is achieved by the general machine 20. At the same time, exhaust generated by the combustion in the engine 21 is directed to an exhaust manifold 211 prior to discharge. The exhaust manifold 211 is thus very hot. A heat resisting cover member 212 is provided on the exhaust manifold 211 for protection. In general, both the exhaust manifold 211 and the heat resisting cover member 212 are hot.

Figure 3:
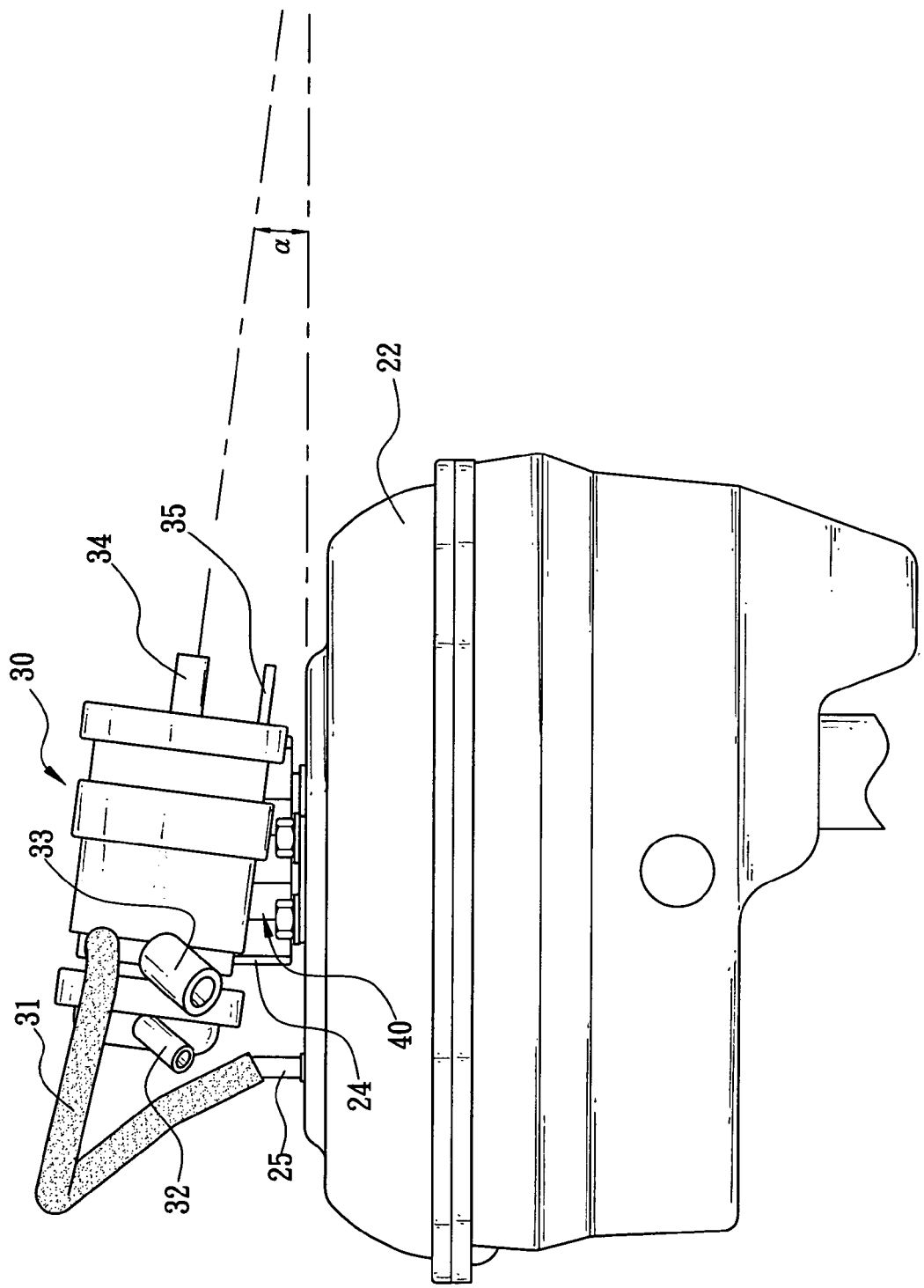
FIG. 3 is a partial view of the general machine of FIG. 2.

The invention is embodied by utilizing the above components. Referring to FIG. 2 again, a gas filtering and recirculating device 30 is provided above the fuel tank 22. At one end of the gas filtering and recirculating device 30 there are provided a gas pipe 31 connected to the gas outlet 25, a negative pressure pipe 32 connected to the carburetor 27, and a gas recirculating pipe 33 connected to the air filter 26. Referring to FIG. 3, at the other end of the gas filtering and recirculating device 30 there are provided an air outlet 34 in fluid communication with atmosphere, and an oil drain 35 below the air outlet 34 but above the fuel tank 22 (i.e., the oil drain 35 is proximate the fuel tank 22 and the air outlet 34 is distal the fuel tank 22).

Referring to FIG. 3 again, in the invention the gas filtering and recirculating device 30 is inclined at an angle of α (e.g., equal to or larger than 10 degrees) with respect to a horizontal plane passing a top of the fuel tank 22. As such, the oil drain 35 of the gas filtering and recirculating device 30 can be located in a position near the top of the fuel tank 22.

Figure 4:
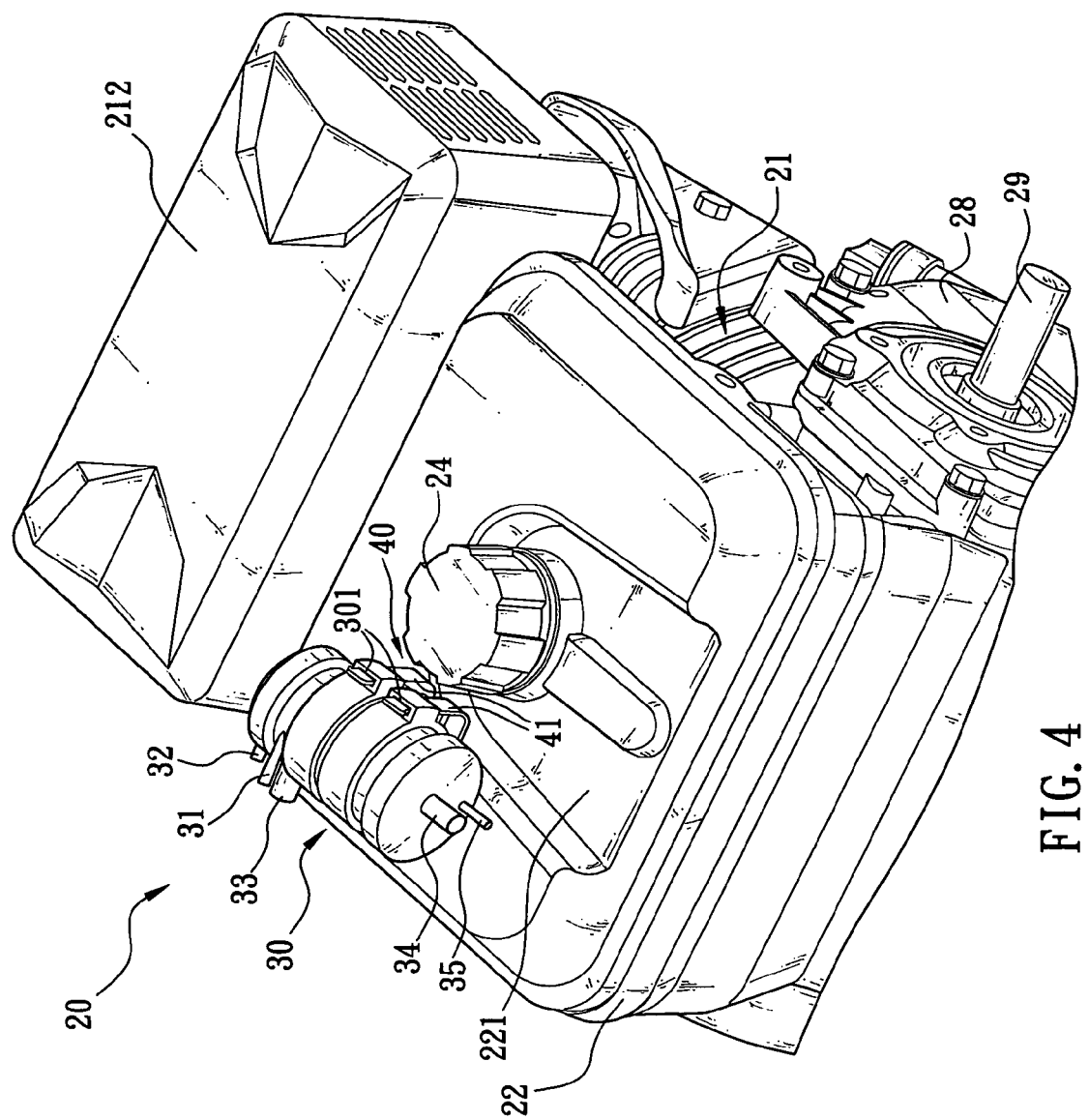
FIG. 4 is a partial perspective view of the general machine of FIG. 2.

Referring to FIG. 4, an oil pan 221 is formed on the flat top of the fuel tank 22. The mouth of the oil drain 35 of the gas filtering and recirculating device 30 is directed to and disposed above the oil pan 221. As such, oil drops formed by accumulating gas may smoothly exit the oil drain 35 to fall on the oil pan 221. The oil pan 221 is relatively cold as compared with the hot exhaust manifold 211 and heat resisting cover member 212. As such, danger caused by the hot surfaces of the separate exhaust manifold 211 and the heat resisting cover member 212 can be prevented.

Referring to FIG. 4 again, there is further provided a mounting member 40 for fixing the gas filtering and recirculating device 30 in a place above the fuel tank 22. The mounting member 40 comprises two spaced latches 41 fastened in two side channels 301 of the gas filtering and recirculating device 30 by snapping. In the embodiment of the invention, the channels 301 are formed of an elastomeric material (e.g., rubber).

Figure 5:
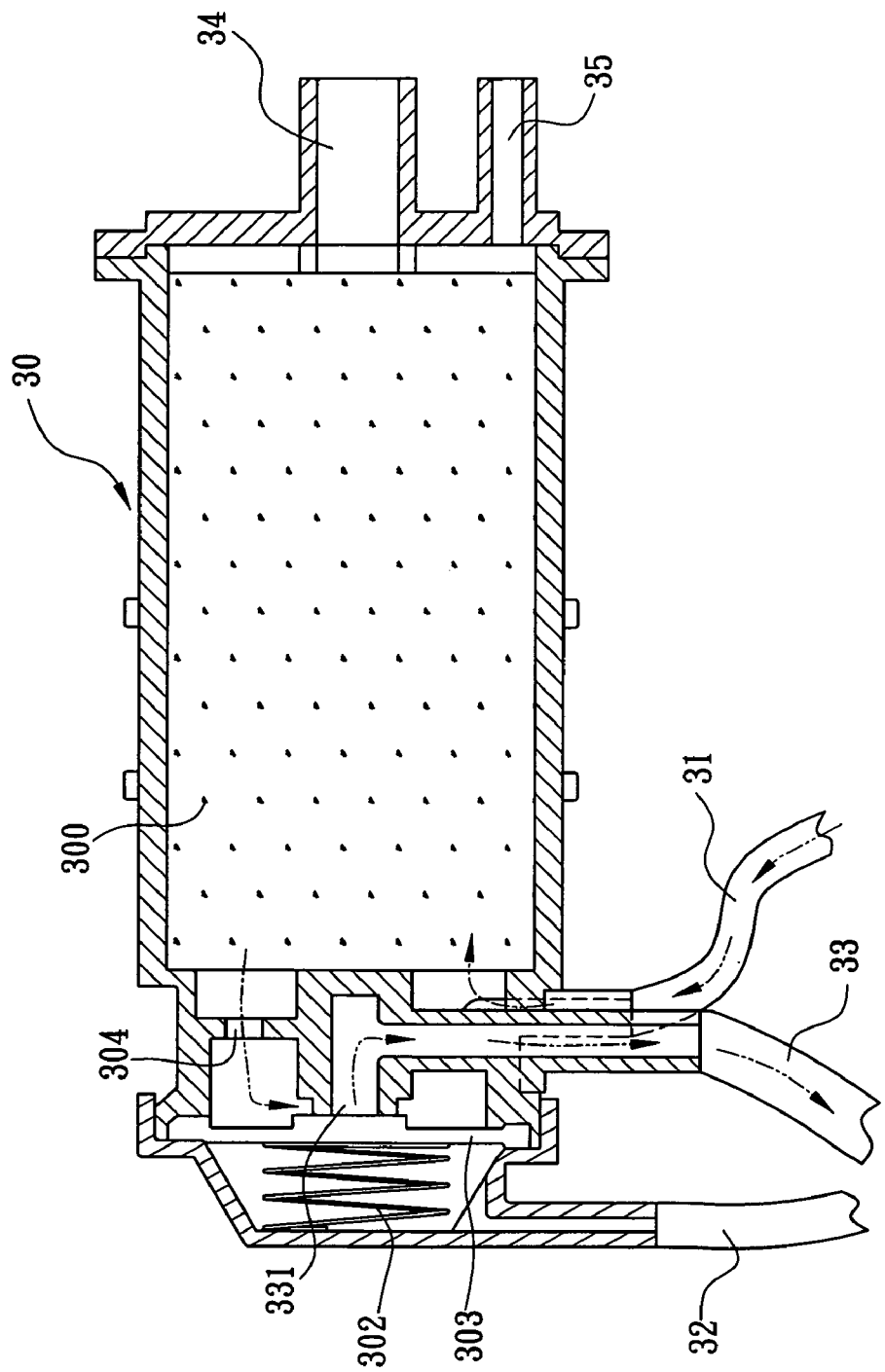
FIG. 5 shows in a sectional view the construction of the gas filtering and recirculating device and its operation of FIG. 2.

FIG. 5 shows in a sectional view the construction of the gas filtering and recirculating device 30 and its operation. The gas filtering and recirculating device 30 is filled with carbon 300 for filtering and absorbing gas. Carbon filter is well known and is not pertinent to the subject of the invention. Accordingly, further description is omitted for the purpose of brevity. As discussed above, the gas pipe 31 is formed at one end of the gas filtering and recirculating device 30 and is connected to the gas outlet 25 of the fuel tank 22. As such, gas generated by evaporating fuel in the fuel tank 22 is directed to the gas filtering and recirculating device 30 through the gas pipe 31. Gas is then filtered and absorbed by carbon 300 in the gas filtering and recirculating device 30. Also, the air outlet 34 at one end of the gas filtering and recirculating device 30 is adapted to discharge filtered gas into the atmosphere. As a result, no air pollution is generated by gas in the fuel tank 22.

In addition, an elastic member 302 is formed at one end of the negative pressure pipe 32. One end of the elastic member 302 is urged an actuation diaphragm 303 against an opening 331 of the gas filtering and recirculating device 30 for closing the same in an inoperative state.

Referring to FIGS. 2 and 5 again, a negative pressure is generated when the engine 21 is operating. The negative pressure will be directed to the actuation diaphragm 303 via the negative pressure pipe 32. The spring biased actuation diaphragm 303 is sucked and is thus disengaged from the opening 331 of the gas filtering and recirculating device 30 for opening the same. As such, gas accumulated in the gas filtering and recirculating device 30 may flow to the gas recirculating pipe 33 through a hole 304 and the opening 331. And in turn, gas flows from the gas recirculating pipe 33 to the air filter 26 of the general machine 20 (see FIG. 2). The feedback gas is filtered in the air filter 26 so as to generate pure air. The pure air is again mixed with fuel in the carburetor 27 prior to flowing to the engine 21 for combustion.

Referring to FIGS. 2 and 4 again, oil drops formed by accumulating gas in the gas filtering and recirculating device 30 may exit the oil drain 35 to fall on the relatively cold oil pan 221 of the fuel tank 22 only (i.e., flowing to other areas is avoided). As such, danger caused by the hot surfaces of the separate exhaust manifold 211 and the heat resisting cover member 212 can be prevented.

In brief, the purpose of ease of maintenance of the gas filtering and recirculating device 30 can be obtained by disposing the gas filtering and recirculating device 30 above the fuel tank 22. Also, gas in the fuel tank 22 is prevented from directly discharging into the atmosphere to pollute air. This complies with applicable environmental laws. Further, oil drops formed by accumulating gas in the gas filtering and recirculating device 30 may exit without blocking since the oil drain 35 is located in a position lower than that of the air outlet 34. This can avoid the blocking of the gas filtering and recirculating device 30. Otherwise, the engine may not start or the operating engine may stop operating suddenly. Furthermore, the gas filtering and recirculating device 30 is inclined at an angle of α with respect to a horizontal plane passing a top of the fuel tank 22. As such, oil drops may smoothly exit the oil drain 35 to fall on the relatively cold oil pan 221 of the fuel tank 22 only (i.e., flowing to other areas is avoided). As an end, danger caused by the hot surfaces of the separate exhaust manifold 211 and the heat resisting cover member 212 can be prevented.

While the invention herein disclosed has been described by means of specific embodiments, numerous modifications and variations could be made thereto by those skilled in the art without departing from the scope of the invention set forth in the claims.

What is claimed is:

1. In a general machine including an engine, a fuel tank provided above the engine, a fuel inlet provided on a top of the fuel tank, a gas outlet provided on the top of the fuel tank, an air filter provided besides the engine, and a carburetor communicating with the air filter, a gas filtering and recirculating device mountable above the fuel tank comprising:

at its one end an air outlet in fluid communication with atmosphere, and an oil drain below the air outlet and above the fuel tank such that the oil drain is proximate the fuel tank.

2. The gas filtering and recirculating device of claim 1, wherein the invention the gas filtering and recirculating device is inclined at an angle of α with respect to a horizontal plane passing the top of the fuel tank such that the oil drain of the gas filtering and recirculating device is located in a position near the top of the fuel tank.

3. The gas filtering and recirculating device of claim 1, further comprising an oil pan formed on the top of the fuel tank.

4. The gas filtering and recirculating device of claim 3, wherein a mouth of the oil drain of the gas filtering and recirculating device is directed to and disposed above the oil pan.

* * * * *